(12) United States Patent
Schleiff et al.

(10) Patent No.: US 10,637,868 B2
(45) Date of Patent: Apr. 28, 2020

(54) COMMON AUTHORIZATION MANAGEMENT SERVICE

(71) Applicant: The Boeing Company, Chicago, IL (US)

(72) Inventors: Martin Schleiff, Bellevue, WA (US); Anthony Andrew Kloba, III, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 60 days.

(21) Appl. No.: 15/353,122

(22) Filed: Nov. 16, 2016

(65) Prior Publication Data
US 2018/0139209 A1    May 17, 2018

(51) Int. Cl.
*H04L 29/06* (2006.01)
*H04W 12/06* (2009.01)

(52) U.S. Cl.
CPC .......... *H04L 63/104* (2013.01); *H04W 12/06* (2013.01); *G06F 2221/2141* (2013.01); *H04L 63/0815* (2013.01)

(58) Field of Classification Search
CPC ...... H04L 63/104; H04L 63/08; H04W 12/06; G06F 21/6218; G06F 3/1222; G06F 3/1238; G06F 3/1285
USPC ............................................. 726/2–4, 26–27
See application file for complete search history.

(56) References Cited

U.S. PATENT DOCUMENTS

| | | | | |
|---|---|---|---|---|
| 8,856,865 B1* | 10/2014 | Martini | .................. | H04L 63/20 709/223 |
| 10,257,184 B1* | 4/2019 | Mehta | .................. | H04L 63/083 |
| 2002/0010917 A1* | 1/2002 | Srikantan | ............... | H04L 29/06 725/1 |
| 2005/0060572 A1 | 3/2005 | Kung et al. | | |
| 2005/0257099 A1* | 11/2005 | Bounkong | .............. | G06T 1/005 714/48 |
| 2009/0265753 A1* | 10/2009 | Anderson | ........... | H04L 63/0421 726/1 |
| 2010/0217837 A1* | 8/2010 | Ansari | ................... | G06Q 30/04 709/218 |
| 2010/0275247 A1* | 10/2010 | Jerichow | ............... | H04L 63/105 726/4 |

(Continued)

OTHER PUBLICATIONS

Laura Pearlman et al, A Community Authorization Service for Group Collaboration, IEEE (Year: 2002).*

(Continued)

*Primary Examiner* — Shanto Abedin
(74) *Attorney, Agent, or Firm* — Gates & Cooper LLP

(57) ABSTRACT

An improved method in a computing environment for establishing access for individuals in at least one enterprise with one or more services provided by a plurality of service providers through the use of a Common Authorization Management (CAM) service is described herein. Through the CAM service, an enterprise administrator can group together one or more individuals at one enterprise, identify access rights to one or more services in the plurality of service providers for each group of individuals based on security data defined by a service provider administrator, and associate individuals from the subset of the plurality of groups at each enterprise with access rights to one or more services provided by the plurality of service providers.

16 Claims, 10 Drawing Sheets

(56) References Cited

U.S. PATENT DOCUMENTS

| | | | | |
|---|---|---|---|---|
| 2013/0007845 A1* | 1/2013 | Chang | ............... | G06F 21/62 |
| | | | | 726/4 |
| 2013/0130651 A1* | 5/2013 | Deasy | ............... | H04W 76/10 |
| | | | | 455/411 |
| 2015/0023704 A1 | 8/2015 | Flamini et al. | | |
| 2015/0237041 A1* | 8/2015 | Flamini | ............... | H04L 63/0807 |
| | | | | 726/10 |
| 2016/0191567 A1* | 6/2016 | Chahal | ............... | H04W 12/00 |
| | | | | 726/1 |
| 2016/0269237 A1* | 9/2016 | Higgins | ............... | H04L 63/10 |
| 2017/0116615 A1* | 4/2017 | Burgess | ............... | G06F 16/9017 |
| 2017/0195457 A1* | 7/2017 | Smith, II | ............... | H04L 63/102 |
| 2017/0300732 A1* | 10/2017 | Likar | ............... | H04L 67/306 |
| 2017/0359346 A1* | 12/2017 | Parab | ............... | H04L 67/306 |

OTHER PUBLICATIONS

Extended European Search Report dated Dec. 19, 2017 for European Patent Application No. 17196538.7.

European Examination Report dated Nov. 26, 2018 for European Patent Appln No. 17196538.7.

European Examination Report dated Aug. 2, 2019 for European Patent Appln No. 17196538.7.

Pearlman, L., et al., "A Community Authorization Service for Group Collaboration", Proceedings Third International Workshop on Policies for Distributed Systems and Networks, Jun. 2002, pp. 50-59, XP009066100.

* cited by examiner

COMMON AUTHORIZATION MANAGEMENT SERVICE

TECHNICAL FIELD

The present invention relates generally, but not exclusively, to a computing environment configured to delegate available services provided by service providers to individuals employed by multiple enterprises, and more particularly to establish access rights between individuals at each of these enterprises with one or more services provided by the service providers.

BACKGROUND

Managing administrative authorization (e.g., access rights) for individuals to access services in a plurality of service providers has historically been a challenging problem. In other words, the tracking of individuals and their respective roles at each enterprise and what level of access each individual should have for a particular service has been problematic for administrators to manage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The illustrative examples described below provide an improved method to a computing environment with at least one enterprise, where each enterprise includes individuals that are grouped together seeking to obtain access to one or more services in a plurality of service providers. Typically, administrators at one enterprise are authorized to manage an individual's access rights to services provided by service providers in connection with the enterprise. However, administrators often times are unfamiliar with the administrative tools provided by the service providers to assign access rights for each individual. And in some instances, administrators are often tasked with associating access rights for an individual at a plurality of service providers. Based on this, administrators are not only required to understand the role and access policies for individuals, but also how to use administrative tools in both their own enterprise and also a plurality of service providers.

Thus, an improved method for a computing environment that establishes access rights between groups of individuals in one enterprise with one or more services provided by a plurality of service providers may be advantageous. That is, an improved computing environment that includes a Common Authorization Management (CAM) service configured with a web interface such that service provider administrators can interact and delegate to enterprise administrators the task of associating access rights to individuals. When security data that identifies access rights to one or more services in the plurality of service providers is so delegated, the enterprise administrator, via the CAM service, can then associate a subset of the groups of individuals from the enterprise with access rights to certain services provided by the plurality of service providers. The CAM service, therefore, provides enterprise and service provider administrators with an interactive service that significantly reduces the complexity and inefficiency that is associated with managing multiple access rights for different individuals.

In illustrative examples of the present disclosure, a method, system, and computer-readable medium are provided for establishing access between individuals in an enterprise and one or more services in a plurality of service providers. According to one particular implementation a method is disclosed herein. An example of the inventive method comprises creating a plurality of groups to contain one or more individuals at an enterprise, and receiving security data from a plurality of service providers. The security data identifies access to one or more services provided by each of the plurality of service providers. Moreover, the inventive method comprises determining a subset of the security data that is available for accessing the one or more services provided by each of the plurality of service providers, and associating individuals in the subset of the plurality of groups with the capability to access the one or more services provided by each of the plurality of service providers based on the subset of security data associated with the group.

According to another particular implementation, a system comprises at least a processor and a memory. The memory is communicatively coupled to the at least one processor and computer-readable instructions that, when executed by the at least one process, cause the system to create a plurality of groups to contain one or more individuals at an enterprise, and receive security data from a plurality of service providers. The security data identifies access to one or more services provided by each of the plurality of service providers. Moreover, the system is further configured to determine a subset of the security data that is available for accessing the one or more services provided by each of the plurality of service providers, and associate individuals in the subset of the plurality of groups with the capability to access the one or more services provided by each of the plurality of service providers based on the subset of security data.

According to yet another particular implementation, a computer-readable medium, bearing computer-executable instructions that, when executed on a computer, cause the computer to perform operations comprising creating a plurality of groups to contain one or more individuals at an enterprise, and receiving security data from a plurality of service providers. The security data identifies access to one or more services provided by each of the plurality of service providers. The computer-readable medium also bearing instructions, when executed on a computer, that further cause the computer to perform operations comprising determining a subset of the security data that is available for accessing the one or more services provided by each of the plurality of service providers, and associating individuals in the subset of the plurality of groups with the capability to access the one or more services provided by each of the plurality of service providers based on the subset of security data.

BRIEF DESCRIPTION OF DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EXAMPLES

As briefly described above, examples of the present invention are directed to a computing environment, and in particular to an improved method in the computing environment for establishing access between groups of individuals in at least one enterprise with one or more services provided by a plurality of service providers. In various examples discussed herein, a Common Authorization Management (CAM) service is provided. The CAM service allows an administrator at one service provider to define security data that identifies access rights to one or more services at the service provider. The CAM service also allows an administrator at one service provider to delegate a subset of the security data to at least one enterprise. Once security data has been delegated to an enterprise, an administrator at the enterprise may associate the security data with a subset of groups at the enterprise, which establishes access rights so that each group of individuals from an enterprise is capable of accessing the one or more available services from the plurality of service providers. The CAM service also allows administrators at the enterprise to assign (or de-assign) an individual from a particular group of individuals.

Figure 1:
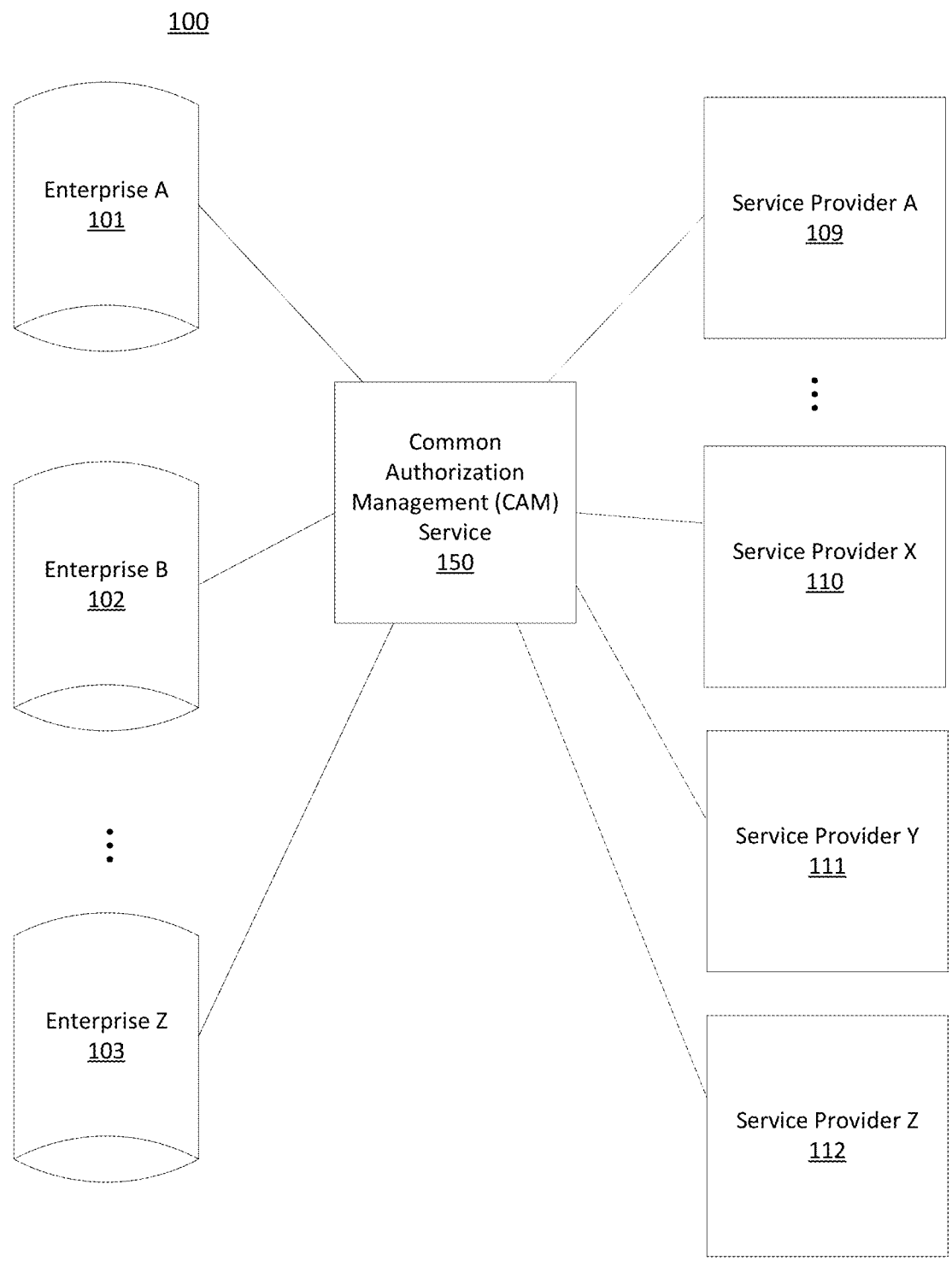
FIG. 1 illustrates a computing environment with at least one enterprise in connection with a plurality of service providers via a Common Authorization Management (CAM) service.

Referring to FIG. 1, a computing environment 100 with at least one enterprise 101-103 and a plurality of service providers 109-112 is illustrated. Furthermore, FIG. 1 illustrates a Common Authorization Management (CAM) service 150 that is configured to receive information from the enterprises 101-103 and the plurality of service providers 109-112. The CAM service 150 is configured with a web interface that allows an administrator or user to interact and direct tasks for the computing environment 100 to perform.

As will be described in more detail below in FIGS. 2-7, an administrator at each enterprise 101-103, via the CAM service 150, can group together certain individuals from within the same enterprise. That is, the administrator at each enterprise, at their discretion, can determine certain enterprise groups that are meaningful or important to their own enterprise. Moreover, the CAM service 150 is further configured to receive security data from the plurality of service providers 109-112. The CAM service 150 is configured to receive information indicative of which subset of the security data is available for access by which enterprise. In other words, an administrator at a service provider 109-112 may delegate to administrators at enterprises 101-103 the task of associating security data with the individuals at each enterprise.

Based on this information, the administrator at an enterprise is then able to associate security data to a subset of the groups of individuals at the enterprise, thereby enabling the individuals within the groups to access one or more services provided by the service providers 109-112. In other words, the individuals in the subset of the plurality of groups originally created by the administrator at the enterprises 101-103 are now configured with the capability to access certain services provided by each of the plurality of service providers 109-112.

In some instances, the CAM service 150 may be accessible from a server separate from the enterprises and the service providers. In yet another instance, the CAM service 150 may be directly installed at any one of the enterprise's systems 101-103 or service providers 109-112 in the computing environment 100.

Figure 2:
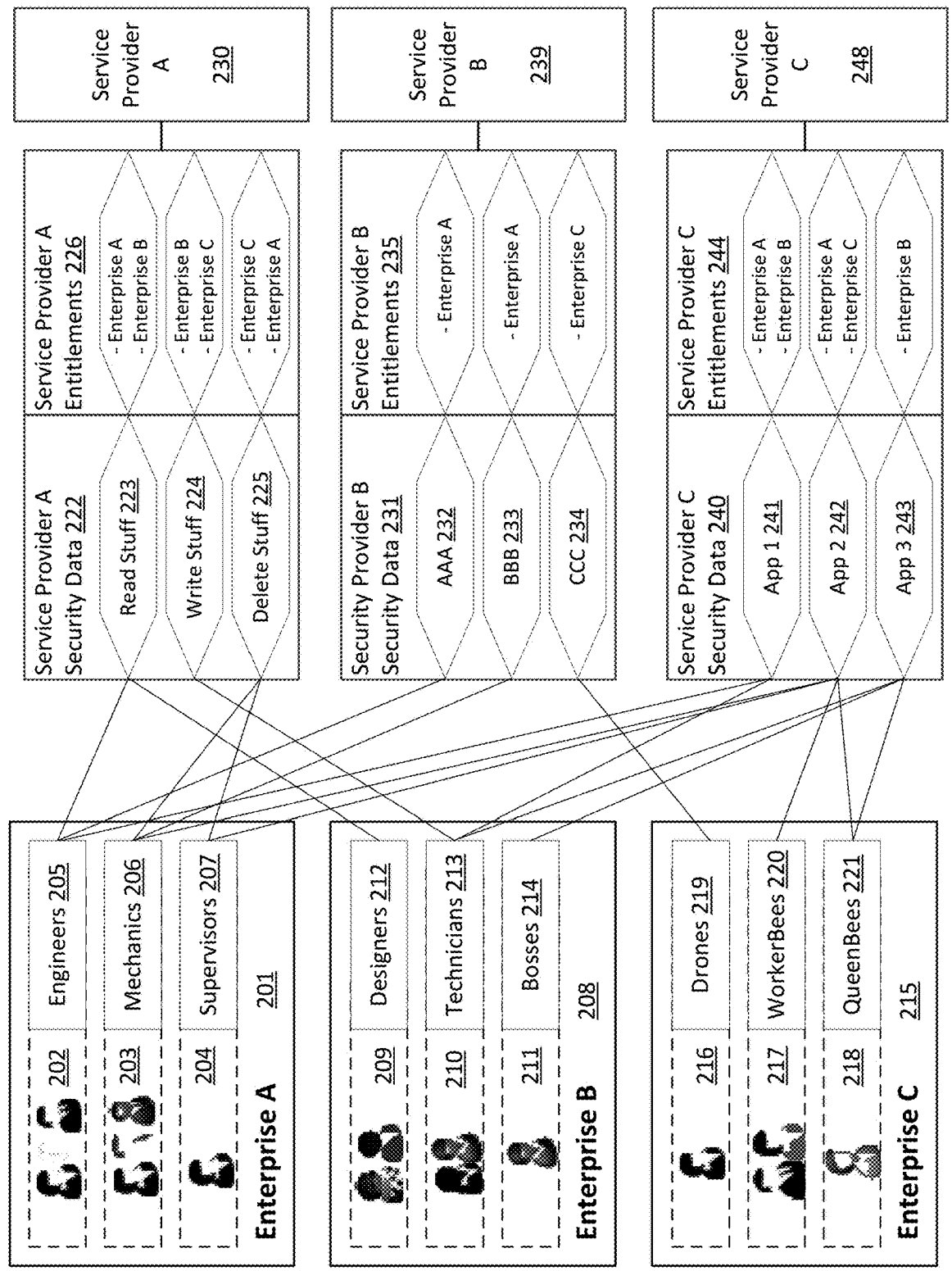
FIG. 2 illustrates a diagram of associating groups of individuals from an enterprise to one or more services in a plurality of service providers.

FIG. 2 illustrates a diagram of associating groups of individuals 202-204, 209-211, 216-218 from at least one enterprise 201, 208, 215 to one or more services 223-225, 232-234, 241-243 in a plurality of service providers 230, 239, 248. For instance, an administrator at Enterprise A 201, via the CAM service (not depicted here in FIG. 2, but shown in FIG. 1), can assign individuals 202 who are engineers at Enterprise A 201 to a group called "Engineers" 205. In another instance, the administrator may assign certain individuals 204 at Enterprise A 201 to a group called "Supervisors" 207. In essence, the administrator has the ability to dynamically create and modify the group of individuals 202-204, 209-211, 219-221 based on different criteria. That is, the administrator can add or remove individuals in each group of an enterprise at any time. The number of individuals for each group may vary (e.g., a group may contain just one individual, a group may contain more than one individual, or a group may contain zero individuals).

After groups 205-207, 212-214, 219-221 have been created, an administrator at an enterprise can then associate security data 222, 231, 240 that has been delegated to the enterprise with each group of the enterprise, thereby establishing access rights or the capability to access at least one or more services 223-225, 232-234, 241-243 provided by the plurality of service providers 230, 239, 248.

The service providers 230, 239, 248 in FIG. 2 are configured to send security data 222, 231, 240 to the CAM service. The security data 222, 231, 240 includes information that identifies the accessibility of the one or more services 223-225, 232-234, 241-243 in the plurality of service providers 221, 228, 235. Specifically, the security data 222, 231, 240 can be first defined by an administrator at a service provider 230, 239, 248. The security data includes information that identifies which of the one or more services 223-235, 232-234, 241-243 provided is available to an enterprise 201, 208, 215. In other words, information regarding the availability of services 223-235, 232-234, 241-243 from the plurality of service providers 221, 228, 235 is sent to the CAM service so that an administrator at the enterprise 201, 208, 215 can associate, match, or map a group of individuals 202-204, 209-211, 216-218 with the capability to access those services 223-235, 232-234, 241-243. Put another way, each of the service providers 230, 239, 248 can define entitlements 226, 235, 244 to specific enterprises. Based on these entitlements 226, 235, 244, the security data 222, 231, 240 sent to the CAM service essentially identifies enterprises that can be associated with a subset of security data.

More specifically, once security data is received at the CAM service, the administrator at each of the enterprises 201, 208, 215 can determine and associate a subset of the groups with a subset of the security data to establish access. Following that, the administrator at each of the enterprises 201, 208, 215 can then associate individuals 202-204, 209-211, 216-218 in the subset of the groups with the capability to access the one or more services 223-235, 232-234, 241-243. In other words, the administrator at each of the enterprises 201, 208, 215 provides a number of groups 205-207, 212-214, 219-221 located in each of the enterprises 201, 208, 215 the capability to access one or more services 223-235, 232-234, 241-243 in the plurality of service providers 230, 239, 248 based on the received security data.

Figure 3:
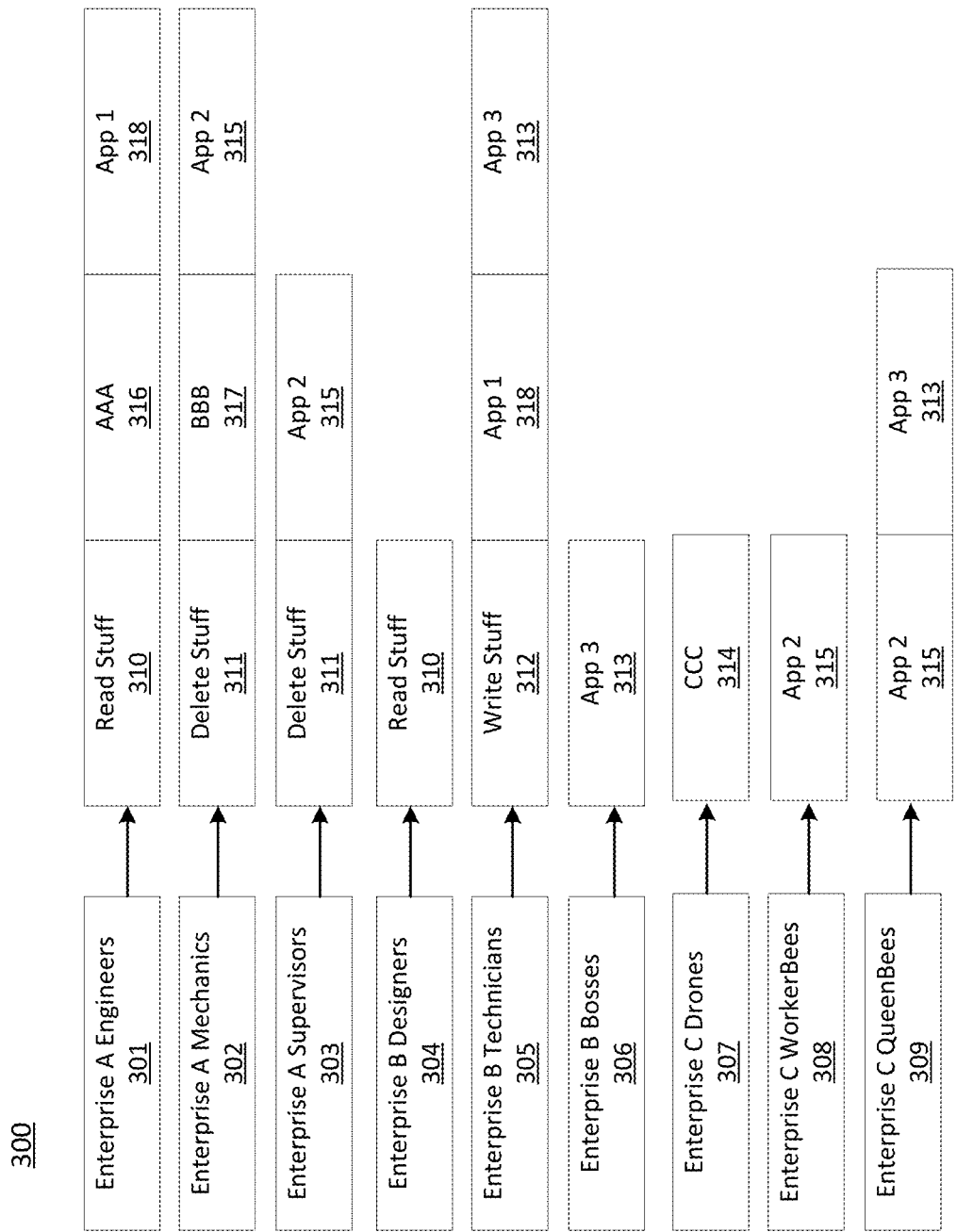
FIG. 3 depicts an example of one or more services that are accessible to specific groups of individuals.

FIG. 3 illustrates the one or more services 310-318 that are accessible to particular groups of individuals 301-309 as depicted in FIG. 2. As described in FIG. 2, the administrator at each enterprise, while using the CAM service, first assigns individuals into a group 301-309 at an enterprise. And when security data is received at the CAM service, the administrator at each enterprise determines a subset of the security data that is available for access by a particular group from the plurality of groups. The administrator at each enterprise can then associate the subset of the security data with a subset of the plurality of groups. Thereby, the administrator at each enterprise can associate individuals 301-309 with security data that identifies one or more services 310-318 in the plurality of service providers that are accessible. For example, in FIG. 3, the group "Engineers" 301 is provided with the capability to access services such as "Read Stuff" 310 from Service Provider A 230 (shown in FIG. 2), perform "AAA" 316 in Service Provider B 239 (shown in FIG. 2), and use "App 1" 318 in Service Provider C 248 (shown in FIG. 2). In another example, FIG. 3 illustrates that the group "Designers" 304 is provided with the capability to access the only the service of "Read Stuff" 310 in Service Provider A 230 (as shown in FIG. 2) but no other services in Service Provider A 230, or services from any other service providers 239, 248.

As described above in FIGS. 1-3, the CAM service is configured to provide administrators at each enterprise the capability to efficiently manage access rights to services for each individual at an enterprise. Once access rights have been established for groups of individuals at each enterprise, an individual in that group may seek to access those services. The CAM service receives and stores information (e.g., security data) regarding these established access rights for each enterprise. Hence, FIGS. 4-6 illustrate example methods of individuals seeking to access at least one service from at least one service provider after access rights have been established as described in FIGS. 1-3.

Figure 4:
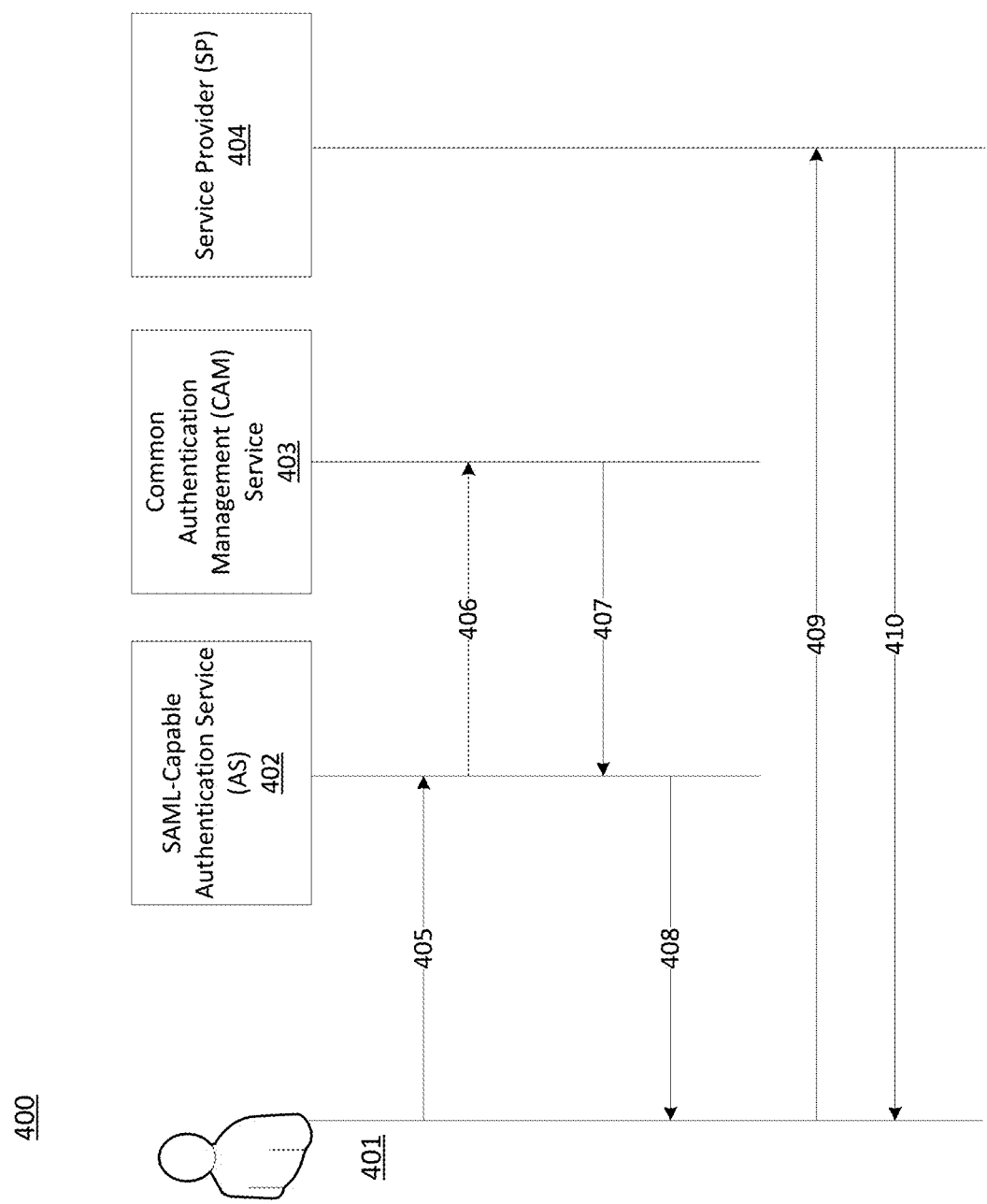
FIG. 4 depicts an example method of an individual authenticating at an authentication service and then accessing one or more services from a service provider as determined by security data obtained from the CAM service and conveyed within Security Assertion Markup Language (SAML) to the service provider.

FIG. 4 depicts an example method 400 of an individual 401 authenticating at an authentication service and then accessing one or more services from a service provider 404 as determined by security data obtained from a Common Authorization Management (CAM) service 403 and conveyed within Security Assertion Markup Language (SAML) to the service provider 404. In particular, FIG. 4 illustrates that an individual 401 at an enterprise is seeking to access a service in service provider 404. The individual first provides a userID, password, and information regarding the target service provider. A SAML-capable Authentication Service (AS) 402 authorizes, authenticates, or validates the userID and password. The AS then forwards 406 the authenticated userID and target service provider information to the CAM service 403. In the alternative, the AS could provide the individual's customer group ID instead of the userID. This could alleviate the need to manage group memberships in the CAM system and allow the AS to leverage its own group/role management capabilities.

Once the CAM service 403 receives the userID, the CAM service 403 is configured to return information regarding the individual's established access rights to the service provider's services 407. That is, the CAM service 403 provides information (e.g., security data) indicative of whether the individual has an access right to the service in the service provider 404. The security data provides information such as privileges, authorizations, or entitlements of whether an individual has access rights to a service. Security data may be in the form of: a claim, an assertion, a security token, or a SAML assertion.

Subsequently, the AS 402 redirects 408 the individual's browser to the service provider's browser with a SAML assertion carrying all the pertinent information regarding the individual's access rights to the service. The browser is then transferred to the service provider's website and the service provider 404 validates the SAML assertion and considers whether to allow the individual access 409 to the services in the service provider 404. When a determination is made, the service provider 404 then sends an appropriate response to the individual's browser 410. Specifically, the appropriate response may include a response such as: allowing the individual to access the services or not allowing the individual to access the services.

Figure 5A:
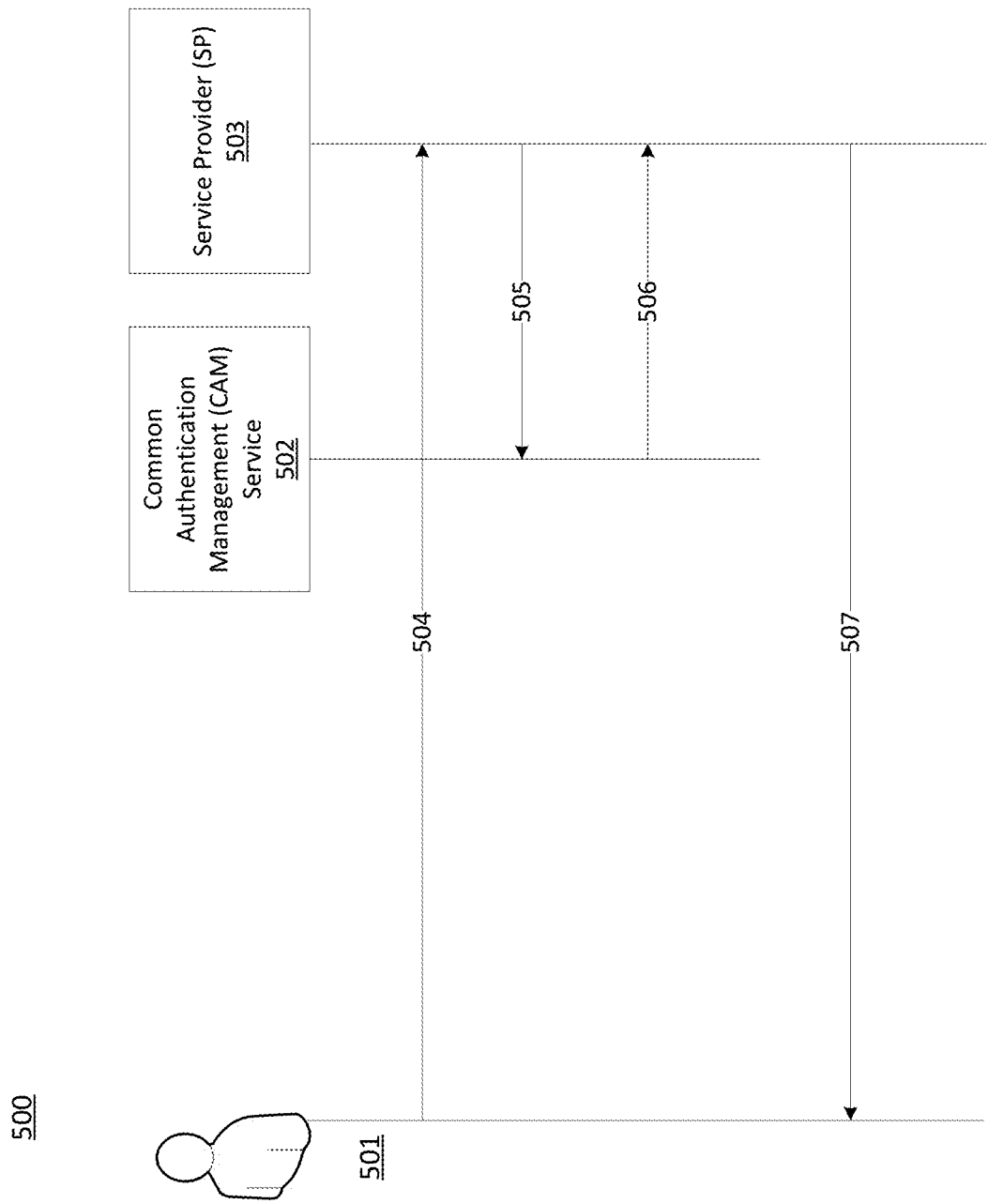
FIG. 5A illustrates an example method of an individual authenticating at a service provider and then accessing one or more services from the service provider as determined by security data obtained from the CAM service in response to a request issued by the service provider.

FIG. 5A illustrates an example method 500 of an individual 501 authenticating at a service provider 503 and then accessing one or more services from the service provider 503 as determined by security data obtained from a CAM service 502 in response to a request issued by the service provider 503. That is, the individual's userID and password is directly sent to the service provider 504 without processing through an AS or the CAM service first. The service provider 503 receives this information. The service provider 503 then authenticates, authorizes, or verifies this information and then sends this authenticated user's userID to the CAM service 502 to request the individual's access rights (e.g., claims or security token) 505. (This is assuming that the mapping of the individual's service provider userID is the same individual's identity in CAM.) As described above, the CAM service 502 includes information indicative of whether each individual has the capability to access one or more services provided by the service provider 503.

Further referring to FIG. 5A, once the CAM service 502 provides the information as to whether the individual has access rights 506, the service provider 503 responds to the individual 501. That is, the service provider 503 sends 507 an appropriate response to the individual 501. Again, the appropriate response includes a response such as: allowing the individual to access the services or not allowing the individual to access the services.

Figure 5B:
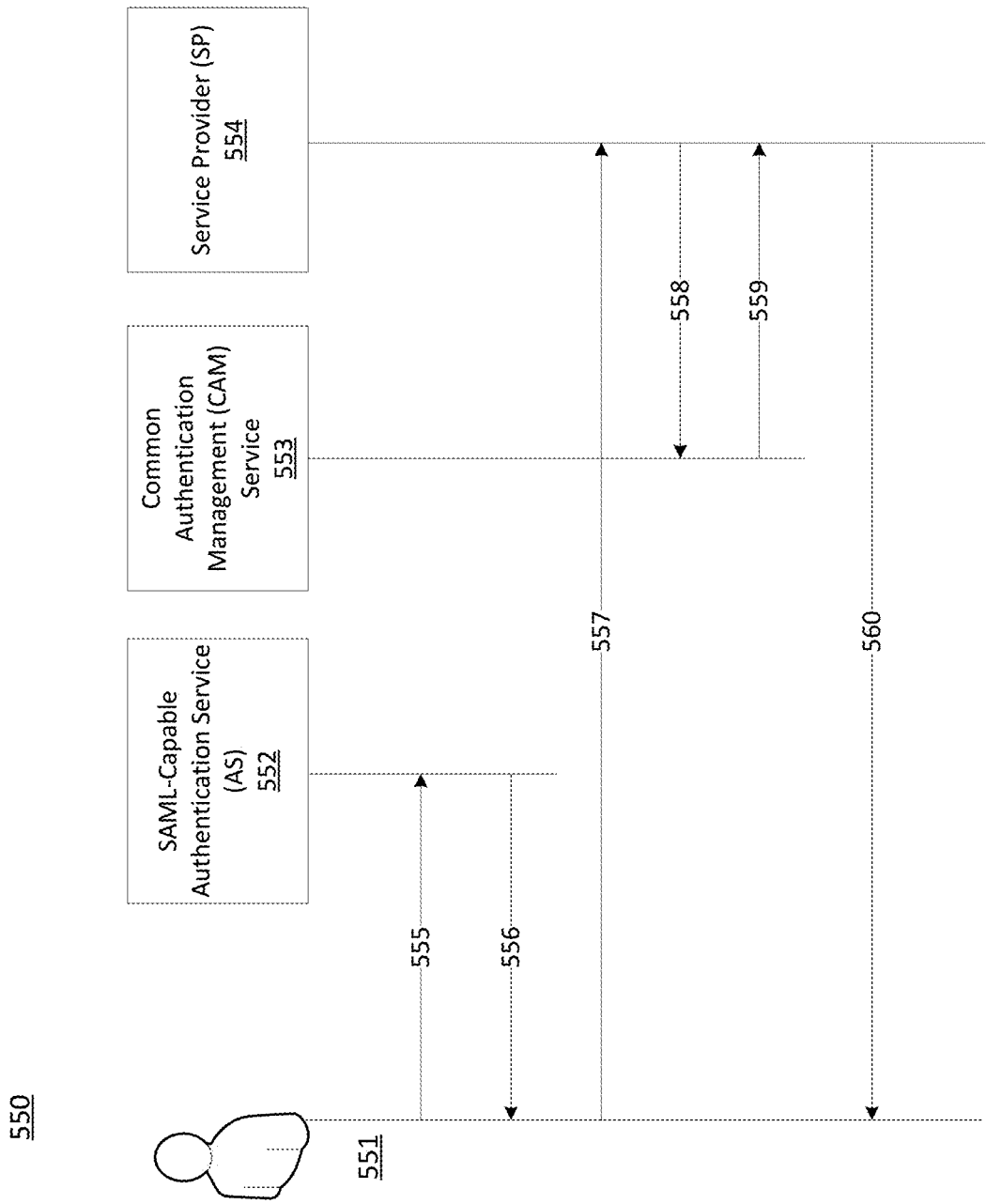
FIG. 5B illustrates an example method of an individual authenticating at an authentication service and then accessing one or more services from a service provider as determined by security data obtained from the CAM service in response to a request issued by the service provider.

FIG. 5B illustrates an example method 550 of an individual 551 authenticating at an authentication service and then accessing one or more services from a service provider 554 as determined by security data obtained from a Common Authorization Management (CAM) service 553 in response to a request issued by the service provider 554. The example method 550 illustrated in FIG. 5B is similar to the example method discussed above with respect to FIG. 5A. The difference is that, in FIG. 5B, the userID and password are first verified, validated, authenticated, or authorized 555 at a SAML-capable Authentication Service (AS) 552. The AS 552 provides the individual with a SAML assertion 556. Once the service provider 554 receives this information (e.g., a SAML assertion and the individual's identity), the service provider 554 will request from the CAM service 553 access rights for this individual 551 based on the individual's identity obtained from the SAML assertion received in 557. In other words, after verifying the received SAML assertion 557, the service provider takes the user's identity (e.g., userID) from the SAML assertion and makes a service call (e.g., RESTful or Simple Object Access Protocol) to CAM to request that user's claims pertinent to the service provider. Based on this, an appropriate response will then be forwarded to the individual 560.

Figure 6A:
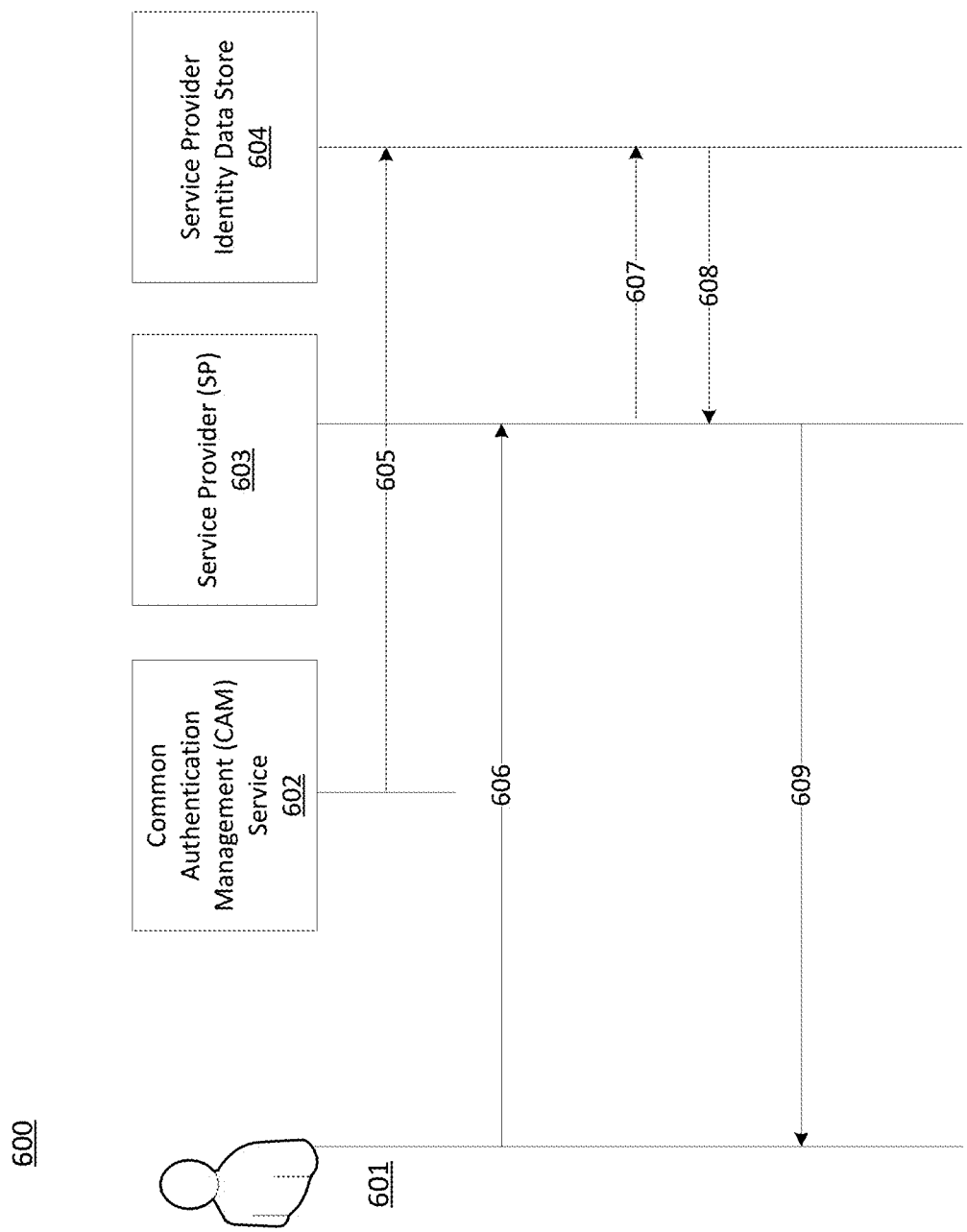
FIG. 6A depicts a diagram representing security data that are periodically synchronized to the service provider via a CAM service, after which a user authenticating at the service provider may access one or more services from the service provider as determined by the security data in a data store at the service provider.

FIG. 6A depicts a diagram 600 representing security data that are periodically synchronized to the service provider 603 via the CAM service 602, after which a user 601 authenticating at the service provider 603 may access one or more services from the service provider 603 as determined by the security data in a data store 604 at the service provider 603. As described above in FIGS. 1-3, access rights are first established to determine which groups of individuals have the right to use certain services in a plurality of service providers. After that occurs, the CAM service 602 can be configured to periodically push or send information regarding the established access rights for each group of individuals 605 to the service provider 603. Specifically, the CAM service 602 periodically (or when directed) pushes security data (e.g., security tokens or claims) to service provider 603. The service provider 603 may include an identity data store 604 configured to store these security tokens or claims. Thus, when an individual 601 requests access 606 and provides the service provider 603 with a userID and password, the service provider 603 may request 607 a user's claims from the data store 604 and the data store 604 will respond with the user's claims. This will determine 607, 608 whether the requesting individual 601 has access rights to the services in the service provider 603. Based on this determination, an appropriate response is then sent 609 back to the individual 601.

Figure 6B:
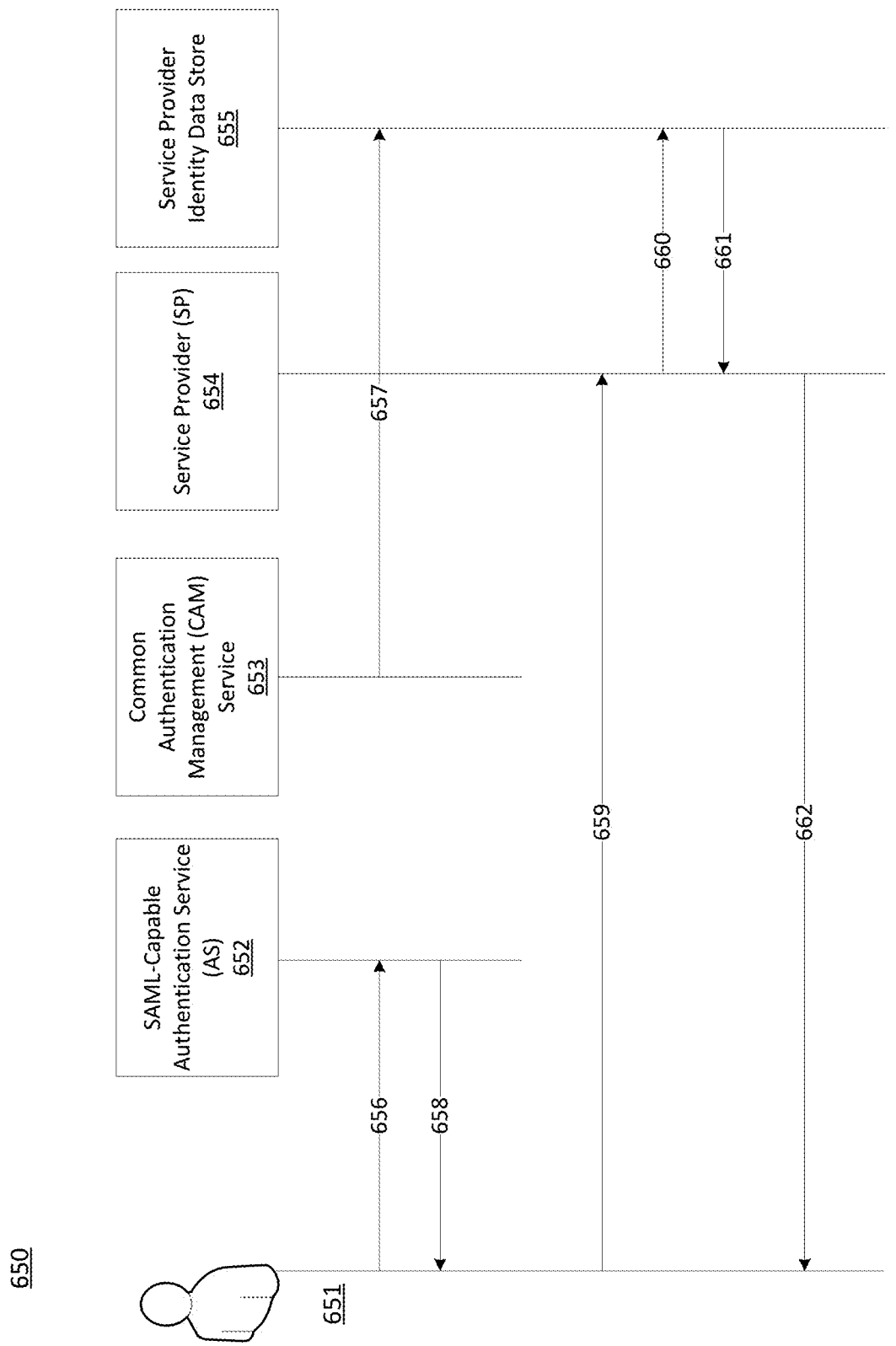
FIG. 6B depicts a diagram representing security data that are periodically synchronized to the service provider via a CAM service, after which a user authenticating with a SAML assertion may access one or more services from the service provider as determined by the security data in a data store at the service provider.

FIG. 6B depicts a diagram 650 representing security data that are periodically synchronized to the service provider via the CAM service 653, after which a user 651 authenticating with a SAML assertion may access one or more services from the service provider 654 as determined by the security data in a data store 655 at the service provider 654. FIG. 6B illustrates a similar example method as FIG. 6A discussed above; however, FIG. 6B includes a determination 656, 658 at the SAML-capable Authentication Service (AS) 652 first for an individual 651. As analyzed above, the AS 652 is configured to first provide a SAML assertion for the individual 651 requesting access. This occurs prior to the service provider 654 determining 660, 661 whether the individual 651 can access services in service provider 654. Based on this determination, an appropriate response is then sent 662 back to the individual 651.

Figure 7:
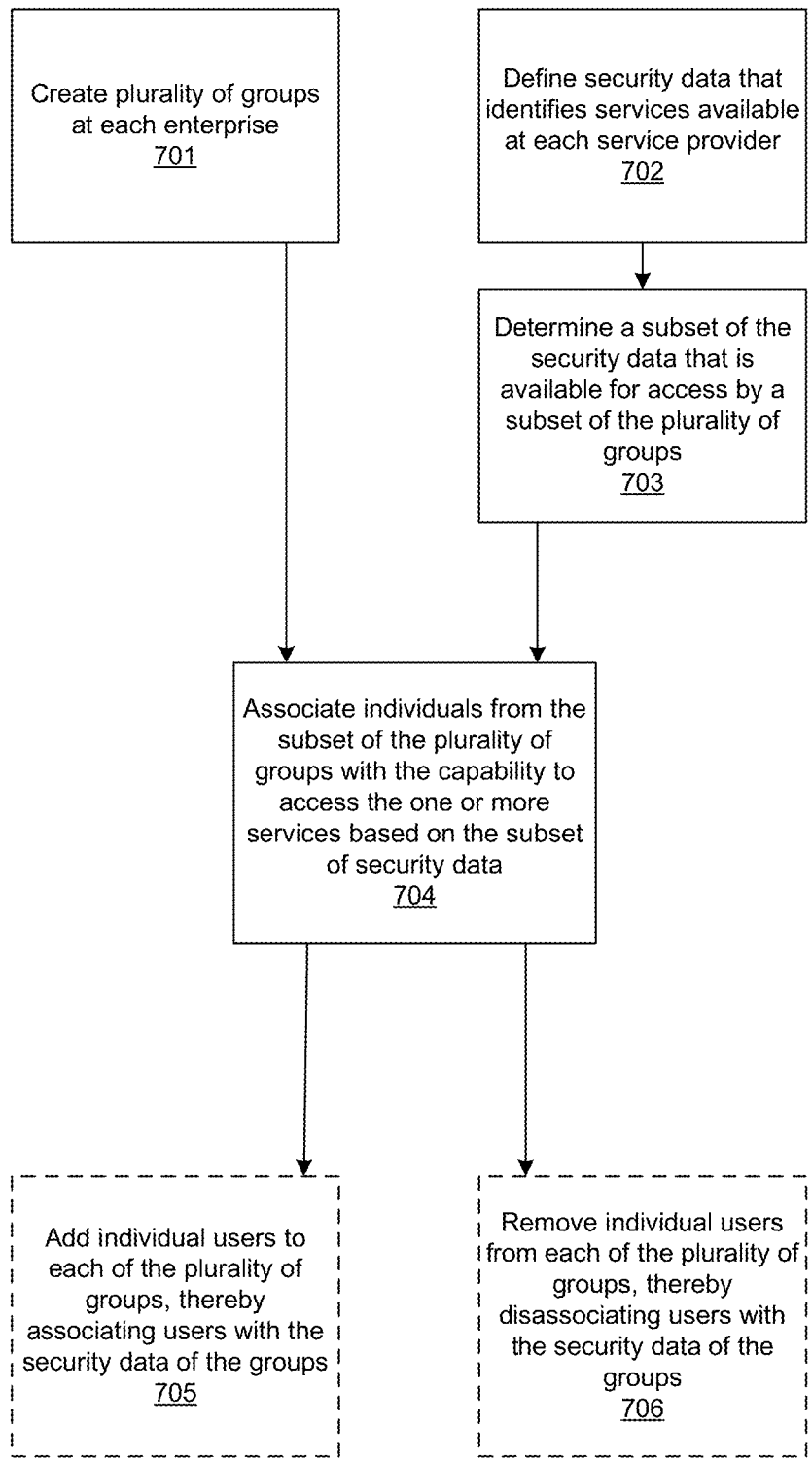
FIG. 7 is a flowchart of an example method of establishing access, via a CAM service, for grouped individuals in at least one enterprise with one or more services in a plurality of service providers.

FIG. 7 is a flowchart 700 of an example method of establishing access via the CAM service for grouped individuals in at least one enterprise with one or more services in a plurality of service providers. In block 701, an administrator at an enterprise, via the CAM service, creates a group of individuals at the enterprise. That is, the administrator at the enterprise consolidates individuals into enterprise groups that are meaningful or important for the enterprise. For instance, all the engineers at the Enterprise A are grouped together into an "Engineers" group. These individuals in the "Engineers" group will then be associated with a subset of security data such that these individuals in the group will have the capability of accessing certain services in a plurality of service providers.

In block 702, the service provider administrators are tasked with defining security data (e.g., security tokens or claims) that are made available and contain information indicative of which enterprise can access the services. This security data is subsequently sent to the CAM service. Furthermore, as shown in block 703, the service provider administrators can also delegate responsibility to the enterprise administrators to associate a subset of the security data to each enterprise. In other words, a determination can be made, at the CAM service, whether a subset of the security data can be made available for access by a subset of the plurality of groups.

In block 704, the CAM service, via a web interface, is configured to provide an enterprise administrator with information with respect to which subset of security data is available for access by which enterprise. That is, the service providers indicate which enterprise can have access rights to the services and pushes this information to the CAM service so that an enterprise administrator can view and manage.

In other words, in block 704, the CAM service receives security data from the plurality of service providers and the enterprise administrator, via the interface of the CAM service, associates a subset of the plurality of groups of individuals at the plurality of enterprises with a subset of the security data received from the plurality of service providers. In particular, the enterprise administrator may, for example, associate the "Engineers" group with a subset of the security data. Thereby, the "Engineers" are then provided with the capability to access one or more services in the plurality of service providers. That is, as described in FIG. 3, when an individual of the "Engineers" group logs into the system at Enterprise A with the individual's userID and password at a later time, the individual will have access to services such as "Read Stuff" from Service Provider A or "App 1" from Service Provider C.

In blocks 705 and 706, the administrators at each enterprise are also tasked with adding and/or removing individual users from each of the plurality of groups. In essence, the administrator at each enterprise has the ability to dynamically create and modify the group of individuals based on different criteria. That is, the administrator can add or remove individuals in each group of an enterprise at any time. As noted above, the number of individuals for each group may vary (e.g., a group may contain just one individual, a group may contain more than one individual, or a group may contain zero individuals).

Figure 8:
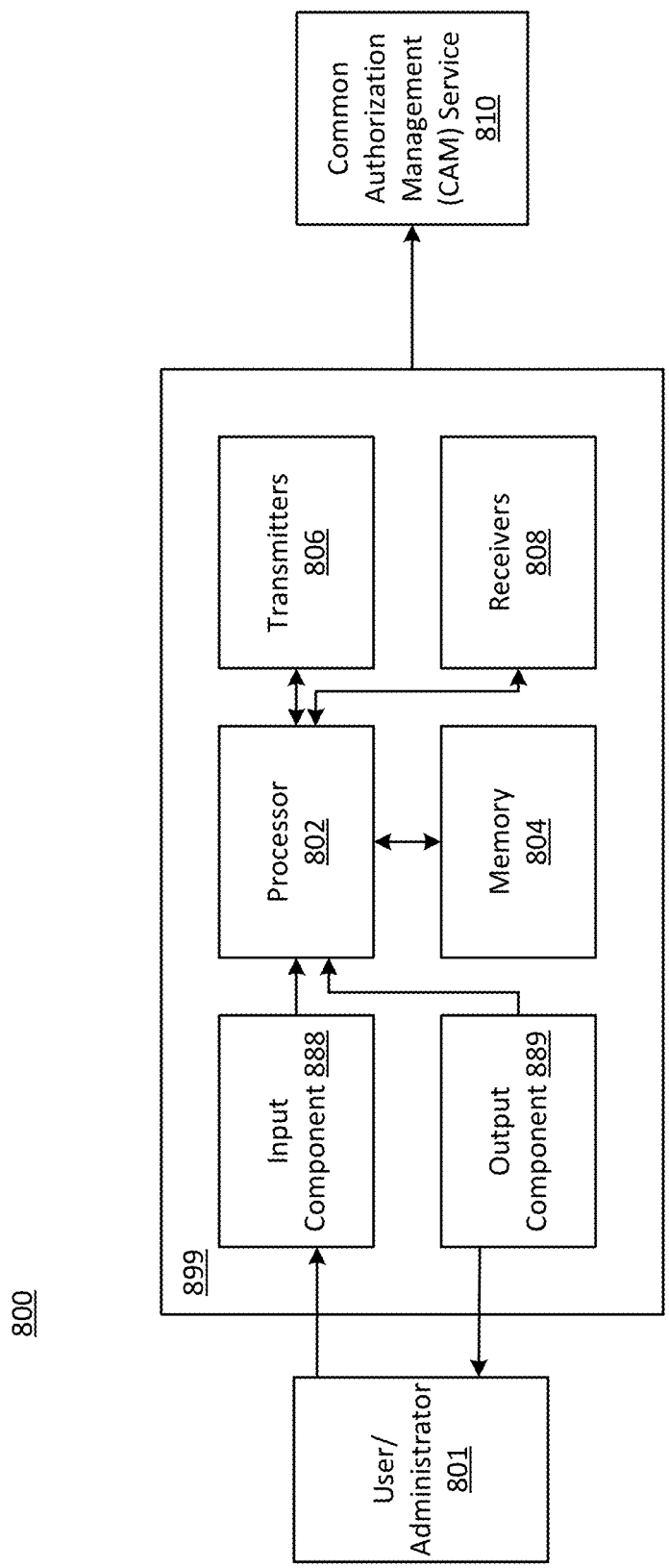
FIG. 8 illustrates an example schematic diagram of a system with a computing device configured to establish access between enterprises and service providers.

FIG. 8 illustrates an example schematic diagram 800 of a system with a computing device 899 configured to establish access between enterprises and service providers via a CAM service 810. Moreover, a user or administrator 801 may direct the computing device to access the CAM service 810 for information pertaining to which groups of individuals at an enterprise have access rights to which services in a plurality of service providers.

In one example, a computing device 899 may include a processor 802, a memory device 804 coupled to processor 802, one or more wireless transmitters 806, one or more wireless receivers 808, an output component 889, and an input component 888.

Processor 802 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are not intended to limit in any way the definition and/or meaning of the term "processor."

Memory device 804 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the example implementation, memory device 804 includes data and/or instructions embodying aspects of the disclosure that are executable by processor 802 (e.g., processor 802 may be programmed by the instructions) to enable processor 802 to perform the functions described herein. Additionally, the memory device 804 may comprise an operation system and applications.

Wireless transmitters 806 are configured to transmit control signals and data signals over a network. In one example, wireless transmitters 806 may transmit in a radio frequency spectrum and operate using an appropriate communication protocol.

Wireless receivers 808 are configured to receive control signals and data signals over network. In one example, wireless receivers 808 may receive signals on a radio frequency spectrum using an appropriate communication program.

The computing device 899 may also include at least one output component 889 for presenting information to a user or administrator 801. Output component 889 may be any component capable of conveying information to user or administrator 801. In some implementations, output component 889 includes an output adapter, such as a video adapter and/or an audio adapter or the like. An output adapter is operatively coupled to processor 802 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 889.

The computing device 899 may also include at least one input component 888 for receiving input from user or administrator 801. Input component 888 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 889 and input component 888. In some implementations, output component 889 and/or input component 888 include an adapter for communicating data and/or instructions between the node and a computer connected thereto.

In some examples, a system memory may be used, which is one example of a computer-readable storage medium, configured to store program instructions and data as described above for FIGS. 1-7 for implementing examples of the corresponding methods and apparatus. However, in other examples, program instructions and/or data may be received, sent, or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory, gateway device, or another type of memory. Portions or all of the multiple computer systems, such as those illustrated herein, may be used to implement the described functionality in various examples; for example, software components running on a variety of different devices and servers may collaborate to provide the functionality.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. As used in the description of the disclosure and the appended claims, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof. Furthermore, the terms "assets" and "computing devices," when used in this specification, may be used interchangeably.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed:

1. A method (700) for authorizing individuals of a plurality of enterprises to access one or more services provided by a plurality of service providers, the method comprising:
creating, by an administrator (801) of each of the plurality of enterprises and via a Common Authorized Management (CAM) service (150), a plurality of groups to contain one or more individuals at one of the plurality of enterprises (701);
receiving security data in the CAM service from each of the plurality of service providers, wherein the security data is defined and provided by an associated service provider administrator at each of the plurality of service providers and the security data identifies which of the one or more services provided by each of the plurality of service providers is available to each of the plurality of enterprises (702);
determining, by the administrator of each of the plurality of enterprises, a subset of the security data that is available for access by a subset of the plurality of groups (703);
receiving associating data in the CAM service from the administrator of each of the plurality of enterprises, the associating data associating individuals in the subset of the plurality of groups with the capability to access the one or more services provided by each of the plurality of service providers based on the subset of security data (704);
receiving a request to access a service of a target service provider from a computing device, the request comprising data including a user identifier of an individual of an enterprise of the plurality of enterprises and information regarding a target service provider in a common authorization management (CAM) service;
in response to the received request, providing information indicative of whether the individual has an access right to the service of the target service provider; and
redirecting the computing device to the target service provider with the information indicative of whether the individual has an access right to the service of the target service provider.

2. The method according to claim 1, wherein the security data comprises at least one of: access rights, privileges, authorizations, claims, Security Assertion Markup Language (SAML) assertions, and entitlements.

3. The method according to claim 2, wherein the security data is accessible by the CAM service.

4. The method according to claim 3, wherein the CAM service is configured with a web interface for user interaction.

5. The method according to claim 1, wherein creating a plurality of groups (205-207, 212-214, 219-221) to contain one or more individuals (202-204, 209-211, 216-218) at an enterprise (201, 208, 215) includes: adding or removing one or more individuals from the plurality of groups.

6. The method of claim 1, wherein:
the request to access the service of a target service provider is provided via a browser executing on the computing device;
the information indicative of whether the individual has an access right to the service of the target service provider comprises a security assertion markup language (SAML) assertion;
redirecting the computing device to the target service provider with the indicative of whether the individual has an access right to the service of the target service provider comprises redirecting the browser with the SAML assertion.

7. The method of claim 1, wherein the CAM pushes further security data for the associated individuals to each of the plurality of service providers.

8. A system (100) for authorizing individuals of a plurality of enterprises to access one or more services (223-225, 232-234, 241-243) provided by a plurality of service providers (230, 239, 248), the system comprising at least one processor (802) and memory (804), the at least one memory communicatively coupled to the at least one processer, the at least one memory comprising computer-readable instructions that, when executed by the at least one processor, cause the system to:
create, via an administrator (801) of each of the plurality of enterprises and using a Common Authorized Management (CAM) service (150), a plurality of groups to contain one or more individuals at one of the plurality of enterprises;
receive security data in the CAM service from each of the plurality of service providers, wherein the security data is defined and provided by an associated service provider administrator at each of the plurality of service providers and the security data identifies which of the one or more services provided by each of the plurality of service providers is available to each of the plurality of enterprises;
determine, by an administrator (801) of each of the plurality of enterprises a subset of the security data that is available for access by a subset of the plurality of groups;
receive associating data in the CAM service from the administrator of each of the plurality of enterprises, the associating data associating individuals in the subset of the plurality of groups with the capability to access the one or more services provided by each of the plurality of service providers based on the subset of security data;
receive a request to access a service of a target service provider from a computing device, the request comprising data including a user identifier of an individual of an enterprise of the plurality of enterprises and information regarding a target service provider in the common authorization management (CAM) service;
in response to the received request, provide information indicative of whether the individual has an access right to the service of the target service provider; and
redirect the computing device to the target service provider with the information indicative of whether the individual has an access right to the service of the target service provider.

9. The system according to claim 8, wherein the security data comprises at least one of: access rights, privileges, authorizations, claims, Security Assertion Markup Language (SAML) assertions, and entitlements.

10. The system according to claim 9, wherein the security data is accessible by the CAM service.

11. The system of according to claim 10, wherein the CAM service is configured with a web interface for user interaction.

12. The system according to claim 8, wherein the creation of a plurality of groups to contain one or more individuals at an enterprise includes: adding or removing one or more individuals from the plurality of groups.

13. A non-transitory computer-readable medium for authorizing individuals of a plurality of enterprises to access one or more services provided by a plurality of service providers, bearing computer-executable instructions that, when executed upon a computer, cause the computer to perform operations comprising:

creating, via an administrator (801) of each of the plurality of enterprises and using a Common Authorized Management (CAM) service (150), a plurality of groups to contain one or more individuals at one of the plurality of enterprises;

receiving security data in the CAM service from each of the plurality of service providers, wherein the security data is defined and provided by an associated service provider administrator at each of the plurality of service providers and the security data identifies which of the one or more services provided by each of the plurality of service providers is available to each of the plurality of enterprises;

determining, by an administrator (801) of each of the plurality of enterprises, a subset of the security data that is available for access by a subset of the plurality of groups;

receiving association data in the CAM service from the administrator of each of the plurality of enterprises, the association data associating individuals in the subset of the plurality of groups with the capability to access the one or more services provided by each of the plurality of service providers based on the subset of security data;

receiving a request to access a service of a target service provider from a computing device, the request comprising data including a user identifier of an individual of an enterprise of the plurality of enterprises and information regarding a target service provider in the common authorization management (CAM) service;

in response to the received request, providing information indicative of whether the individual has an access right to the service of the target service provider; and redirecting the computing device to the target service provider with the information indicative of whether the individual has an access right to the service of the target service provider.

14. The computer-readable medium according to claim 13, wherein the security data comprises at least one of: access rights, privileges, authorizations, claims, Security Assertion Markup Language (SAML) assertions, and entitlements.

15. The computer-readable medium according to claim 14, wherein the security data is accessible by the CAM service.

16. The computer-readable medium according to claim 13, wherein creating a plurality of groups to contain one or more individuals at an enterprise includes: adding or removing one or more individuals from the plurality of groups.

\* \* \* \* \*